United States Patent
Fackert et al.

[11] Patent Number: 5,908,517
[45] Date of Patent: *Jun. 1, 1999

[54] ALLOY, IN PARTICULAR FOR USE IN THE MANUFACTURE OF FRAMES FOR GLASS, JEWELRY, AND THE LIKE

[75] Inventors: Juergen Fackert, Steffenberg; Klaus Tauber, Biebertal; Bruno Rechtziegel, Heuchelheim, all of Germany

[73] Assignee: Berkenhoff GmbH, Heuchelheim, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/877,458

[22] Filed: Jun. 17, 1997

[30] Foreign Application Priority Data

Jun. 21, 1996 [DE] Germany ............ 196 24 732

[51] Int. Cl.⁶ .................................. C22C 9/04
[52] U.S. Cl. .................. 148/434; 420/477; 420/478; 420/480
[58] Field of Search ............ 148/434; 420/477, 420/478, 480

[56] References Cited

U.S. PATENT DOCUMENTS

| | | | |
|---|---|---|---|
| 2,085,416 | 6/1937 | Corson | 75/155 |
| 4,242,131 | 12/1980 | Shapiro et al. | 75/157.5 |
| 5,270,001 | 12/1993 | Rechtziegel et al. | 420/480 |

FOREIGN PATENT DOCUMENTS

| | | |
|---|---|---|
| 0 545 231 | 6/1993 | European Pat. Off. . |
| 26 26 251 C2 | 1/1977 | Germany . |
| 38 34 186 A1 | 4/1990 | Germany . |
| 90 17 408 U | 3/1991 | Germany . |
| 41 31 426 A1 | 3/1993 | Germany . |
| 41 40 262 C1 | 6/1993 | Germany . |

OTHER PUBLICATIONS

Kaps et al., "Structure and properties of cast copper–aluminum alloys", giessereitechnik (1985), 31(10), 320–1 (provide with abstract only).

*Primary Examiner*—Sikyin Ip
*Attorney, Agent, or Firm*—Flynn, Thiel, Boutell & Tanis, P.C.

[57] ABSTRACT

A high-temperature, nickel-free alloy, in particular for spectacle frames, jewelry, etc. with the following composition in percentages by weight:

| | |
|---|---|
| Zn | 13.0–16.0% |
| Mn | 9.0–11.0% |
| Fe | 1.0–2.0% |
| Al | 4.0–5.5% |
| Cu | the remainder. |

9 Claims, 2 Drawing Sheets

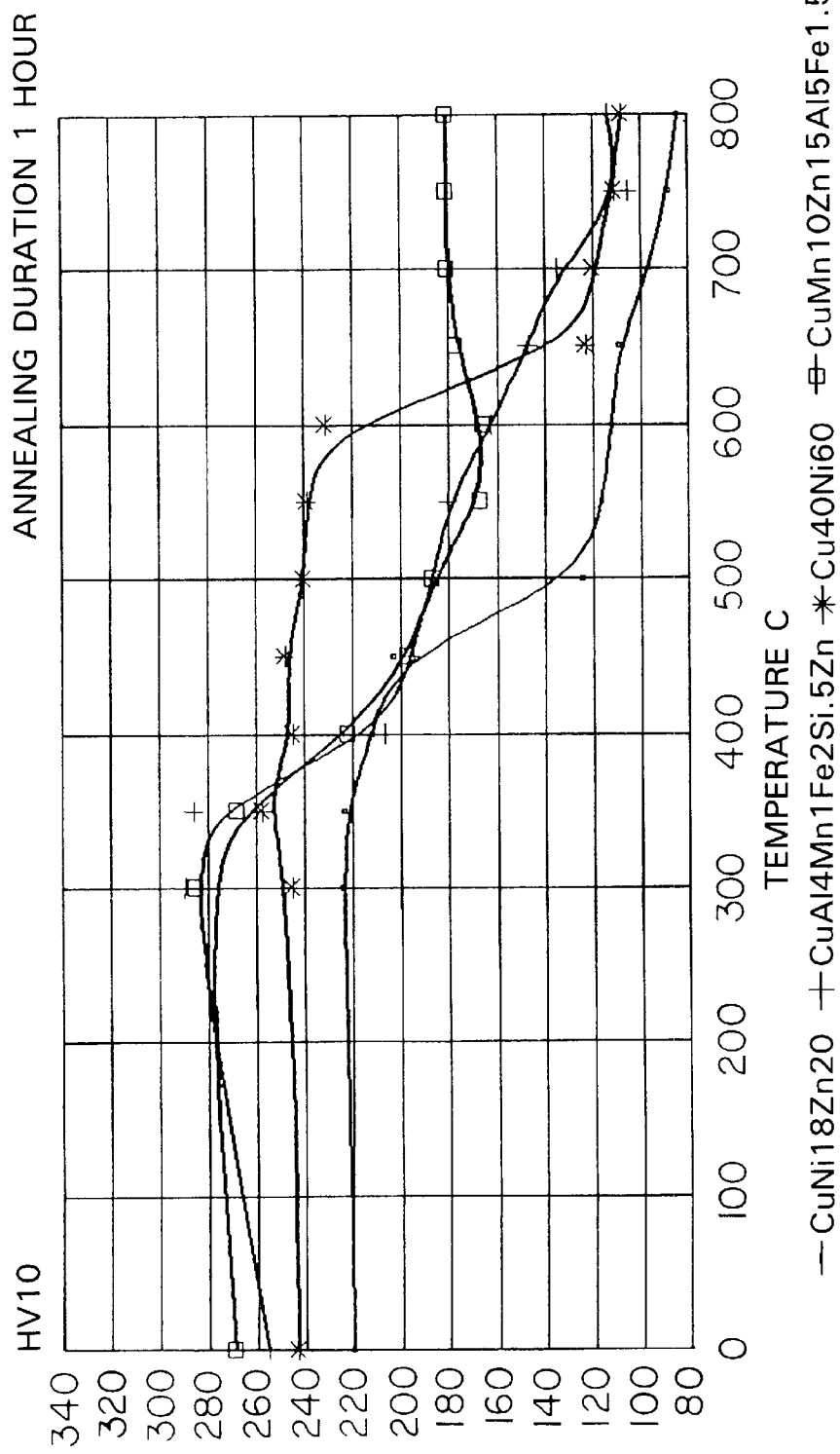

ALLOY, IN PARTICULAR FOR USE IN THE MANUFACTURE OF FRAMES FOR GLASS, JEWELRY, AND THE LIKE

FIELD OF THE INVENTION

The invention relates to an alloy which is used in particular for the manufacture of spectacle frames (frames for glass) and, however, also for jewelry and other body-contacting metal parts to be worn on the body or to be attached to clothing. The invention relates furthermore to spectacle frames and also jewelry, metal parts for clothing which are manufactured using the alloy, and intermediate products and starting materials, for example spectacle wire, for the manufacture of the spectacle frames and jewelry or their parts using the alloy.

BACKGROUND OF THE INVENTION

When manufacturing spectacle frames, jewelry, metal parts to be worn on the body or similar items, different criteria have to be met in order to be able to use the product in practice. On the one hand, it is necessary for the manufactured products to be sufficiently strong and, on the other hand, optical demands must be met. The problems of strength arise in particular in the case of spectacle glasses, and there mainly in the rims of the glasses, the hinges or the bows.

Problematic, in particular in the case of spectacle frames, is that they must be soldered once or several times in order to, for example, fasten the hinges or center bridges. The metal softens due to heating so that the alloys must have a high heat resistance so that the spectacle frames remain elastic.

Also for other jewelry, for example brooches, rings, earrings, chains, bands or similar items, it is absolutely necessary that the alloy has, even after the influence of heat, specified strength values in order to avoid mechanical damage during use. Furthermore additional physical characteristics must be met for certain uses, for example with respect to heat conductivity, length expansion coefficient, electrical resistance and electrical conductivity. A further criteria for the selection of such an alloy is its manufacturing ability. The alloy is to be both easily pourable in order to manufacture the necessary blanks, for example, by continuous casting or casting in molds, and also be shapeable in order to be able to produce, for example, rods, wires, bands or similar items from the alloy. Alloys, which partly or fully meet the above-mentioned requirements, are described, for example, in the Gebrauchsmuster 90 17 408.9 or the DE-OS 38 34 186. Also the DE-PS 26 26 251 describes such an alloy. For example, Monel metal has proven to be very good for the above-mentioned uses. Monel metal, however, has nickel contents of approximately 60% to 70%.

The mentioned alloys are distinguished by having a relatively high nickel content. This nickel content is increasingly undesired in jewelry, spectacle frames and other articles, which are worn directly on the skin, since a large number of people have an allergy against nickel. Among others caused by the increasing stress on the environment, the percentage of the population affected by such allergies is on the increase so that nickel-containing alloys are increasingly rejected by the customers. Help comes in some cases from coatings or envelopings, however, this is not possible for most uses. Furthermore, these coatings and envelopings wear off and/or wear at least in certain areas caused by increased use or body contact in those areas.

An alloy for the mentioned purposes is already known from DE-Offenlegungsschrift 41 31 426 A1 (corresponds to U.S. Pat. No. 5,270,001), which alloy does not require the addition of nickel and thereby has a very good mechanical strength and a good corrosion resistance and can be processed in the usual manner. Such an alloy can thus be used in particular for jewelry and to a limited degree also for spectacle frames or similar items without causing nickel allergies to the wearers or users. Additional protective measures, such as, for example, coatings, lacquers or similar measures, with which nickel-containing alloys coming into direct contact with the skin is avoided, are not needed in the finished products. This alloy enables thus a simple, inexpensive manufacturing of the respective products, while, on the other hand, it is also suitable for coatings not containing nickel, for example for decoration purposes, and is distinguished by a good cold-forming property and good elastic characteristics. Also, its processing ability is good. However, a drop in strength occurs during hard-soldering or welding so that the use for spectacle frames is only possible to a limited degree.

SUMMARY OF THE INVENTION

The purpose of the invention is to provide an alloy, which with a continued inexpensive manufacturing ability, a simple processing ability and without the use of nickel, has a high heat resistance or high-temperature strength comparable to the Monel metal alloy or even better.

The purpose is attained according to the invention with an alloy useful in the manufacture of spectacle frames, jewelry and other body-contacting metal parts worn on the body or attached to clothing, consisting essentially of, in percentages by weight:

| | |
|---|---|
| Zn | 13.0–16.0% |
| Mn | 9.0–11.0% |
| Fe | 1.0–2.0% |
| Al | 4.0–5.5% |
| Cu | the remainder. |

This inventive alloy is distinguished as a nickel-free alloy by a softening temperature higher by up to 150° C. compared with the up to now known nickel-free alloys so that during its thermal processing, relatively high temperatures do not also result in an undesired softening. On the other hand, the heat conductivity of the alloy of the invention is very low so that it is very well suited, for example, for soldering because only a small amount of heat is needed for soldering and other soldered areas or other heat-sensitive areas are not affected thereby. These improvements in the thermal behavior are achieved by the alloy of the invention without the high mechanical standards of the already known alloys having to be abandoned, for example, the elastic characteristics are guaranteed also in the bows and rims of spectacle frames. This alloy can also be advantageously used for coins, especially since there exists, besides little wear, freedom from nickel. In addition there exist good processing characteristics.

BRIEF DESCRIPTION OF THE DRAWINGS

FIG. 2 is a hardness value/temperature graph of known and nickel-containing alloys and the inventive alloy.

DETAILED DESCRIPTION

Figure 1:
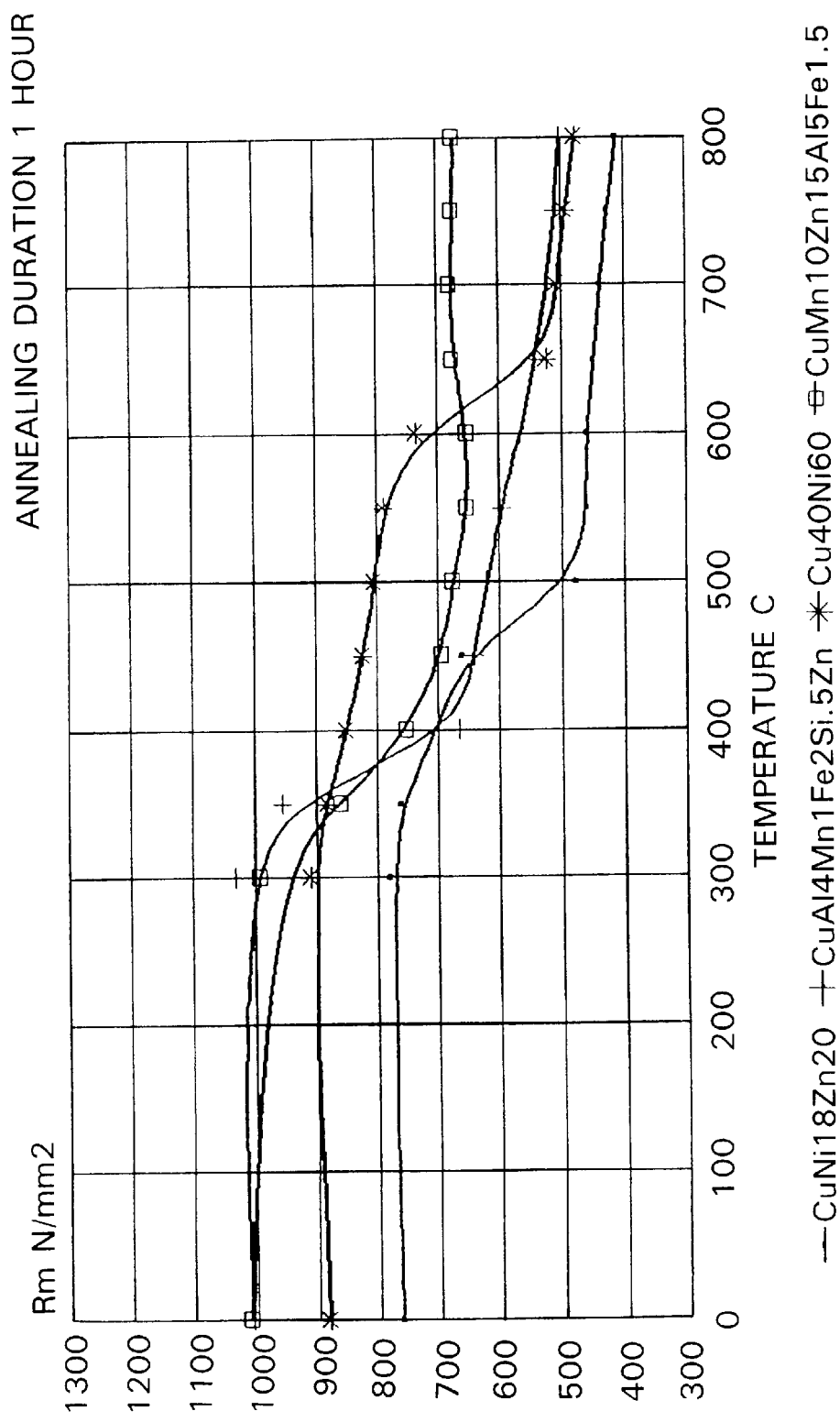
FIG. 1 is a tensile strength/temperature graph of known and nickel-containing alloys and the inventive alloy.

The enclosed drawings (FIGS. 1 and 2) illustrate the tensile strengths and also the hardness values of the known nickel-containing alloys in dependency of the temperature, whereby these values run approximately parallel. The alloy CuNi18Zn20 already has at room temperature a relatively low strength, which upon the effect of heat, drops considerably. Monel metal (Cu40Ni60) has a relatively high initial strength, which above temperatures of 300° C., decreases first slowly and then more rapidly. The inventive alloy (CuMn10Zn15A15Fe1.5) has a higher resistance to cold, whereby the drop in strength is indeed initially slightly greater than in Monel metal, however, the final strength at higher temperatures is higher than in Monel metal. The alloy of the invention thus offers a perfect replacement for Monel metal, without containing its disadvantageous nickel.

Although a particular preferred embodiment of the invention has been disclosed in detail for illustrative purposes, it will be recognized that variations or modifications of the disclosed alloy lie within the scope of the present invention.

The embodiments of the invention in which an exclusive property or privilege is claimed are defined as follows:

1. Spectacle frames, consisting essentially of, in percentages by weight:

| | |
|---|---|
| Zn | 13.0–16.0% |
| Mn | 9.0–11.0% |
| Fe | 1.0–2.0% |
| Al | 4.0–5.5% |
| Cu | the remainder. |

2. The alloy according to claim 1, wherein the percentages by weight are:

| | |
|---|---|
| Zn | 14.0–15.0% |
| Mn | 9.5–10.5% |
| Fe | 1.3–1.7% |
| Al | 4.3–5.0% |
| Cu | the remainder. |

3. Spectacle frames, consisting of, in percentages by weight:

| | |
|---|---|
| Zn | 13.0–16.0% |
| Mn | 9.0–11.0% |
| Fe | 1.0–2.0% |
| Al | 4.0–5.5% |
| Cu | the remainder. |

4. The alloy according to claim 3, wherein the percentages by weight are:

| | |
|---|---|
| Zn | 14.0–15.0% |
| Mn | 9.5–10.5% |
| Fe | 1.3–1.7% |
| Al | 4.3–5.0% |
| Cu | the remainder. |

5. The alloy according to claim 4, wherein the percentages by weight are:

| | |
|---|---|
| Zn | 15.0% |
| Mn | 10.0% |
| Fe | 1.5% |
| Al | 5.0% |
| Cu | the remainder. |

6. A spectacle frame in which the improvement comprises at least a part thereof comprising the alloy of claim 3.

7. In a method of manufacturing spectacle frames, the improvement comprising said spectacle frames being manufactured from an alloy consisting of:

| | |
|---|---|
| Zn | 13.0–16.0 wt. % |
| Mn | 9.0–11.0 wt. % |
| Fe | 1.0–2.0 wt. % |
| Al | 4.0–5.5 wt. % |
| Cu | the remainder. |

8. The method of claim 7, wherein said alloy consists of:

| | |
|---|---|
| Zn | 14.0–15.0 wt. % |
| Mn | 9.5–10.5 wt. % |
| Fe | 1.3–1.7 wt. % |
| Al | 4.3–5.0 wt. % |
| Cu | the remainder. |

9. The method of claim 8, wherein said alloy consists of:

| | |
|---|---|
| Zn | 15.0 wt. % |
| Mn | 10.0 wt. % |
| Fe | 1.5 wt. % |
| Al | 5.0 wt. % |
| Cu | the remainder. |

* * * * *